United States Patent
Bosch et al.

(10) Patent No.: US 9,491,686 B2
(45) Date of Patent: Nov. 8, 2016

(54) VIRTUAL PRIVATE NETWORKING WITH MOBILE COMMUNICATION CONTINUITY

(75) Inventors: Hendrikus G. P. Bosch, Aalsmeer (NL); Rahul Aggarwal, Menlo Park, CA (US); Bin W. Hong, San Jose, CA (US); Srinivasa Chaganti, San Ramon, CA (US); Apurva Mehta, Cupertino, CA (US); Prem Ananthakrishnan, San Jose, CA (US); Pulikeshi Vitalapura Ramanath, Fremont, CA (US); Thomas Wayne Anderson, Naperville, IL (US); Hartmut Schroeder, Duisburg (DE); Serpil Bayraktar, Los Gatos, CA (US)

(73) Assignee: Pulse Secure, LLC, San Jose, CA (US)

( * ) Notice: Subject to any disclaimer, the term of this patent is extended or adjusted under 35 U.S.C. 154(b) by 1260 days.

(21) Appl. No.: 13/332,163

(22) Filed: Dec. 20, 2011

(65) Prior Publication Data
US 2013/0031271 A1 Jan. 31, 2013

Related U.S. Application Data

(60) Provisional application No. 61/512,874, filed on Jul. 28, 2011.

(51) Int. Cl.
*H04W 40/24* (2009.01)
*H04W 40/36* (2009.01)
*H04W 84/04* (2009.01)
(Continued)

(52) U.S. Cl.
CPC .............. *H04W 40/36* (2013.01); *H04L 45/52* (2013.01); *H04W 40/24* (2013.01); *H04W 40/246* (2013.01); *H04W 40/248* (2013.01); *H04W 84/042* (2013.01); *H04W 92/00* (2013.01);
(Continued)

(58) Field of Classification Search
CPC ............... H04L 12/4641; H04L 29/06; H04L 63/0272; H04L 63/08; H04L 45/52; H04W 8/087; H04W 84/005; H04W 40/36; H04W 40/24; H04W 40/246; H04W 40/248; H04W 84/042; H04W 92/00; H04W 92/02
See application file for complete search history.

(56) References Cited

U.S. PATENT DOCUMENTS 7,389,534 B1 6/2008 He
7,675,912 B1 3/2010 Ward et al.
(Continued)

OTHER PUBLICATIONS

Bhagavathula et al., "Mobility: A VPN Perspective," The 2002 45th Midwest Symposium on Circuits and Systems Conferences Proceedings, Aug. 4-7, 2002, vol. 3, 4, pp. III-89-III-92.
(Continued)

*Primary Examiner* — Le H Luu
(74) *Attorney, Agent, or Firm* — Shumaker & Sieffert, P.A.

(57) ABSTRACT

In general, a mobile virtual private network (VPN) is described in which service provider networks cooperate to dynamically extend a virtual routing area of a home service provider network to the edge of a visited service provider network and thereby enable IP address continuity for a roaming wireless device. In one example, a home service provider network allocates an IP address to a wireless device and establishes a mobile VPN. The home service provider network dynamically provisions a visited service provider network with the mobile VPN, when the wireless device attaches to an access network served by the visited service provider network, to enable the wireless device to exchange network traffic with the visited service provider network using the IP address allocated by the home service provider network.

30 Claims, 10 Drawing Sheets

(51) Int. Cl.
　　　H04W 92/02　　(2009.01)
　　　H04W 92/00　　(2009.01)
　　　H04L 12/781　 (2013.01)
　　　H04L 12/723　 (2013.01)
　　　H04W 80/04　　(2009.01)
(52) U.S. Cl.
　　　CPC .............. *H04W 92/02* (2013.01); *H04L 45/50* (2013.01); *H04W 80/04* (2013.01)

(56) References Cited

U.S. PATENT DOCUMENTS

| | | | |
|---|---|---|---|
| 8,089,897 B2 | 1/2012 | Qian et al. | |
| 2002/0133534 A1* | 9/2002 | Forslow | H04L 12/4641 709/200 |
| 2006/0067265 A1* | 3/2006 | Chen | H04L 12/4641 370/328 |
| 2006/0185012 A1* | 8/2006 | Olivereau | H04L 29/06 726/14 |
| 2007/0006295 A1* | 1/2007 | Haverinen | H04L 63/0272 726/14 |
| 2007/0008924 A1* | 1/2007 | Moran | H04L 12/4641 370/331 |
| 2008/0002607 A1* | 1/2008 | Nagarajan | H04W 8/087 370/328 |
| 2008/0151868 A1 | 6/2008 | Kezys | |
| 2008/0205357 A1* | 8/2008 | Pandey | H04W 84/005 370/338 |
| 2009/0016361 A1 | 1/2009 | Serbest et al. | |
| 2009/0310535 A1 | 12/2009 | Anumala et al. | |
| 2010/0332615 A1* | 12/2010 | Short | H04L 63/08 709/217 |
| 2012/0155329 A1 | 6/2012 | Shaffer et al. | |
| 2013/0054763 A1 | 2/2013 | Van der Merwe et al. | |

OTHER PUBLICATIONS

3GPP TS 23.401 V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.
3GPP TS 23.402 V10.4.0, 3rd Generation Partnership Project; Technical Specification Group Services and System Aspects; Architecture enhancements for non-3GPP accesses, (Release 10), Jun. 2011, 231 pp.
3GPP TS 23.234 V6.10.0, 3rd Generation Partnership Project; Technical Specification Group Services and System Aspects; 3GPP system to Wireless Local Area Network (WLAN) interworking; System description (Release 6), Sep. 2006, 75 pp.
Bates et al, "Multiprotocol Extensions for BGP-4," RFC 2858, Jun. 2000, 11 pp.
Rosen et al., "BGP/MPLS IP Virtual Private Networks (VPNs)," RFC 4364, Feb. 2006, 48 pp.
Perkins, "IP Mobility Support for IPv4," RFC 3344, Aug. 2002, 93 pp.
Arkko et al., "Enhanced Route Optimization for Mobile IPv6," RFC 4866, May 2007, 51 pp.
Dierks et al., "The Transport Layer Security (TLS) Protocol Version 1.2," RFC 5246, Aug. 2008, 105 pp.
Kent, "IP Encapsulating Security Payload (ESP)," RFC 4303, Dec. 2005, 42 pp.
Eronen, "IKEv2 Mobility and Multihoming Protocol (MOBIKE)," RFC 4555, Jun. 2006, 31 pp.
Kaufman, "Internet Key Exchange (IKEv2) Protocol," RFC 4306, Dec. 2005, 93 pp.
U.S. Appl. No. 12/967,977, by Yin Wei, filed Dec. 14, 2010.
Search Report from European patent application No. 12177422.8, dated Oct. 18, 2013, 10 pp.
Search Report from European patent application No. 12177422.8, dated Jun. 26, 2013, 5 pp.
Response to Search Report dated Oct. 18, 2013, from counterpart European Patent Application No. 12177422.8, filed May 15, 2014, 29 pp.
First Office Action dated Oct. 10, 2014, from counterpart Chinese Patent Application No. 201210269216.9, filed Jul. 30, 2012, 11 pp.
Examination Report from counterpart European Application No. 12177422.8, dated Oct. 13, 2015, 5 pp.
Response to Examination Report dated Oct. 13, 2015, from counterpart European Application No. 12177422.8, filed Feb. 9, 2016, 3 pp.

\* cited by examiner

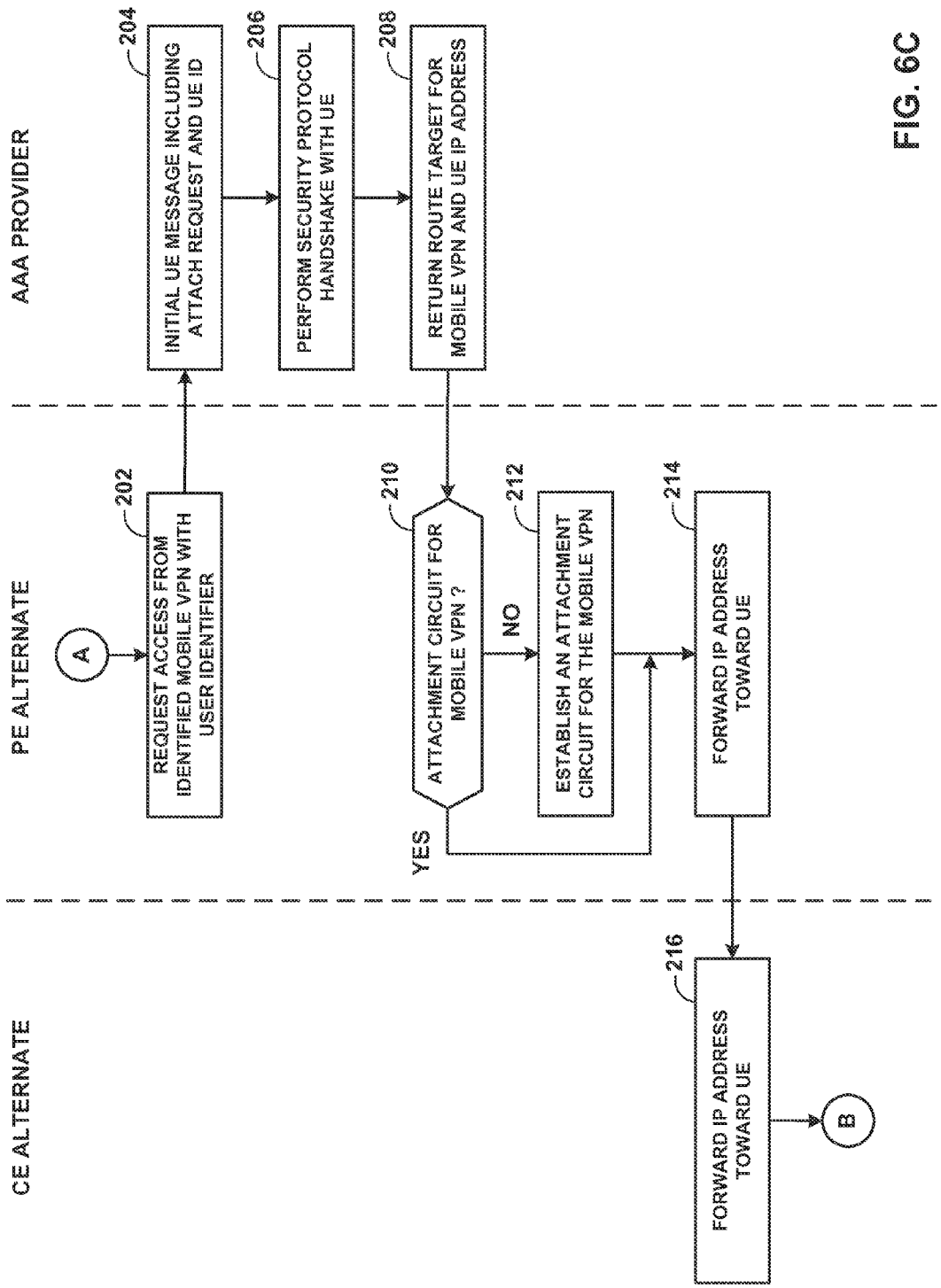

| MOBILE VPN TABLE 300 | |
|---|---|
| PROVIDER ID | AC |
| A | AC1 |
| B | AC2 |
| C | AC3 |

VIRTUAL PRIVATE NETWORKING WITH MOBILE COMMUNICATION CONTINUITY

PRIORITY CLAIM

This application claims the benefit of U.S. Provisional Application No. 61/512,874, filed Jul. 28, 2011, the entire content of which is incorporated herein by reference.

TECHNICAL FIELD

The invention relates to mobile networks and, more specifically, to roaming among access networks of service provider networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS), an evolution of UMTS referred to as Long Term Evolution (LTE), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, or mobile network, includes a core packet-switched network, a transport network, and one or more radio access networks (RANs). The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

Some wireless devices, in addition to supporting connections to a mobile service provider network via a RAN, also support wireless local area network (WLAN) access network connections that provide connectivity to a broadband network via a WiFi "hotspot" or other wireless access point (WAP). These wireless devices may support WLAN offload while dual-connected to a RAN of a mobile service provider network as well as to a WLAN access network that is not connected to the mobile service provider core packet-switched network. That is, such wireless devices may route specific IP flows via the WLAN access network rather than via the RAN in order to avoid traversing the mobile service provider network. However, in such cases, a wireless device uses the local IP address allocated by the WLAN for such IP flows, and neither the WLAN nor mobile service provider network provides IP address preservation to the wireless device to allow "seamless" WLAN offload for IP flows to permit uninterrupted operation of higher-level protocols. While overlay networks that tunnel IP flows between a WLAN and a mobile service provider network or between multiple mobile service provider networks may provide inter-network connectivity, such overlay networks prevent the service providers from enforcing traffic policies and services. In addition, overlay networks require that the roaming wireless device participate in establishing a tunnel to connect itself to an anchor point of the mobile service provider network for the wireless device.

SUMMARY

In general, techniques are described that provide seamless roaming for mobile virtual private networks (VPNs) between cellular radio networks and local wireless access networks. For example, service provider networks may utilize the techniques to dynamically extend virtual routing areas of home service provider networks to the edge of a visited service provider network and thereby enable network data service continuity for a roaming wireless device.

As an example, a wireless device attaches to a home service provider network ("home network") that provides access to packet-based services via a regional cellular network, and the wireless device receives from the home network an IP address that is anchored to a home mobile gateway, or H-MGW, of the home network. The home network also establishes a mobile VPN having routes that are distinct and separate from the default routing space of the home network as well as any other VPNs supported by the home network. The wireless device may then subsequently roam and establish wireless connectivity, e.g., via an alternate access network such as a local WiFi network, with a visited mobile gateway (V-MGW) served by a visited service provider network ("visited network"). The wireless device sends a wireless identifier that specifies the home network of the wireless device to the V-MGW using the established access channel to the V-MGW. The V-MGW, in turn, signals its serving provider edge (PE) router of the visited network to request connectivity to the mobile VPN of the home network specified by the wireless identifier. The PE router of the visited network signals the mobile VPN of the home network to join and begin receiving routes associated with the mobile VPN. The V-MGW may also map the access channel for the wireless device to an attachment circuit from the V-MGW to the serving PE router that the serving PE router associates with the mobile VPN in a mapping table.

Upon receiving the previously assigned IP address for the wireless device, either from the wireless device itself as a product of authentication or from the authentication infrastructure of the home network, the serving PE advertises a route for the IP address prefix of the wireless device to the mobile VPN, which distributes the route to the H-MGW that anchors the mobile service provider network attachment for the wireless device. As a result, service traffic that enters the mobile VPN at the H-MGW and is destined for the IP address of the wireless device is routed by the H-MGW to the V-MGW, which relays such traffic toward the wireless device using the access channel mapped to the mobile VPN. Similarly, the V-MGW uses routes received for the mobile VPN to forward IP traffic, received from the attached wireless device via the access channel, to the H-MGW via the mobile VPN mapped to the attachment circuit.

Dynamically extending a mobile VPN in this manner may enable the anchor point of the wireless device to the mobile VPN to migrate among gateways of different types of access networks (e.g., cellular and WiFi) while remaining within a common routing area defined by the mobile VPN. As a result, the techniques may permit a wireless device to retain an IP address assigned by a home access network when roaming to a visited access network, despite the home and visited access network deploying divergent access technologies. IP address continuity may provide a number of advantages, including higher-level protocol (e.g., TCP, UDP, and application-layer) session continuity, offloading of IP traffic to a WLAN broadband network, and geographical redundancy of anchors in a cellular system.

Additionally, when a mobile service provider's service plane is connected to a mobile VPN, services continue unhindered when a wireless device roams and connects to a visited, alternative access network. The techniques may also permit existing visited network providers to route traffic to the appropriate home service provider and avoid providing Internet connectivity or enhanced services, while leveraging premier service provider's customer populations to monetize the investment in the visited network providers' networks. From the perspective of the home network providers, the techniques may allow existing premier service providers to extend their access capabilities through well-integrated third-party access infrastructures (i.e., those of the visited networks). In addition, the techniques may simplify the roaming infrastructure by alleviating a requirement of overlay tunnels between the visited and home networks and between the wireless device and anchor point of the home network. As a result, the techniques may allow the provider networks to apply traffic engineering to service traffic and otherwise improve the efficiency of network paths toward wireless devices.

In one embodiment, a method comprises allocating an Internet Protocol (IP) address to a wireless device with a home service provider network having a mobile virtual private network (VPN) that defines routes that are distinct and separate from a default routing space of the home service provider network. The method also includes dynamically extending the mobile VPN from the home service provider network to a visited service provider network when the wireless device attaches to an access network served by the visited service provider network to enable the wireless device to exchange network traffic with the visited service provider network using the IP address allocated by the home service provider network.

In another embodiment, a method comprises attaching to a cellular wireless access network with a wireless device and receiving an IP address for the wireless device from the wireless access network. The method also comprises subsequent to receiving the IP address from the wireless access network, attaching to a non-cellular wireless access network with the wireless device and receiving, with the wireless device, packets destined for the IP address from the alternate wireless access network.

In another embodiment, a method comprises peering, with a peering exchange system, to a home service provider network. The method also comprises peering, with the peering exchange system, to a visited service provider network, and extending, with the peering exchange system, a mobile virtual private network (VPN) established by the home service provider network to a visited service provider network.

In another embodiment, a method comprises establishing, with a network device, an access channel for a wireless device attached to a wireless access network. The method also comprises associating, in context information of the network device, the access channel to an Internet Protocol (IP) address of the wireless device. The method further comprises receiving, with the network device, a first packet addressed to the IP address of the wireless device and, based at least on the context information, forwarding the first packet to the wireless device using the access channel. The method also comprises receiving, with the network device, a route associated with a mobile virtual private network (VPN), wherein the route specifies a prefix corresponding to the IP address of the wireless device and a next hop router. The method also comprises receiving, with the network device, a second packet addressed to the IP address of the wireless device and, based at least on the route, forwarding the second packet to the next hop router.

In another embodiment, a mobile gateway comprises a control unit comprising one or more processors and a plurality of interface cards. An enhanced Universal Mobile Telecommunications System (E-UTRAN) interface of the control unit establishes a bearer over a wireless access network and associates, in context information, the bearer to an IP address, wherein one of the plurality of interface cards receives a first packet addressed to the IP address of the wireless device. The mobile gateway also comprises a forwarding component that, based at least on the context information, forwards the first packet to the wireless device using the bearer. The mobile gateway further comprises a routing protocol daemon of the control unit that executes a routing protocol to receive a route, wherein the route specifies a prefix corresponding to the IP address of the wireless device and a next hop router, wherein one of the plurality of interface cards receives a second packet addressed to the IP address of the wireless device, wherein the forwarding component, based at least on the route, forwards the second packet to the next hop router.

In another embodiment, a network device comprises a control unit having one or more processors and a plurality of interface cards. The network device also comprises a mobile virtual private network (VPN) table having a plurality of entries that each associates a service provider identifier for a service provider with an attachment circuit to a mobile VPN associated with the service provider.

In another embodiment, a system comprises an autonomous system border router (ASBR) of a Multiprotocol Label Switching (MPLS) service provider network and a provider edge (PE) router that offers, to wireless devices, connectivity to the service provider network, wherein the PE router receives a user identifier and a mobile virtual private network (VPN) identifier from a wireless device, and wherein the PE router receives a route target for the identified mobile VPN. The system also comprises a VPN routing and forwarding (VRF) instance of the PE router that is associated with the route target, wherein the PE router sends the route target to the ASBR to join the mobile VPN, wherein the ASBR receives a route for the route target and associated with the identified VPN from an ASBR of a visited service provider network and forwards the route and a backbone MPLS label to the PE router, wherein the route specifies the ASBR as a next hop router, wherein the PE router installs the route and backbone MPLS label to the VRF instance, wherein the PE router receives, from the wireless device, a packet matching the route, encapsulates the packet within the backbone MPLS label, and forwards the labeled packet to the ASBR, and wherein the ASBR identifies the visited service provider network using the backbone MPLS label and forwards the packet to the ASBR of the visited service provider network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6A-6C illustrate flowcharts representing example modes of operation of network system components to dynamically extend a mobile VPN to facilitate wireless device roaming and connectivity continuity according to techniques described in this disclosure.

FIG. 8 is a mobile VPN table that includes entries to map respective attachment circuits to service provider identifiers.

DETAILED DESCRIPTION

Figure 1:
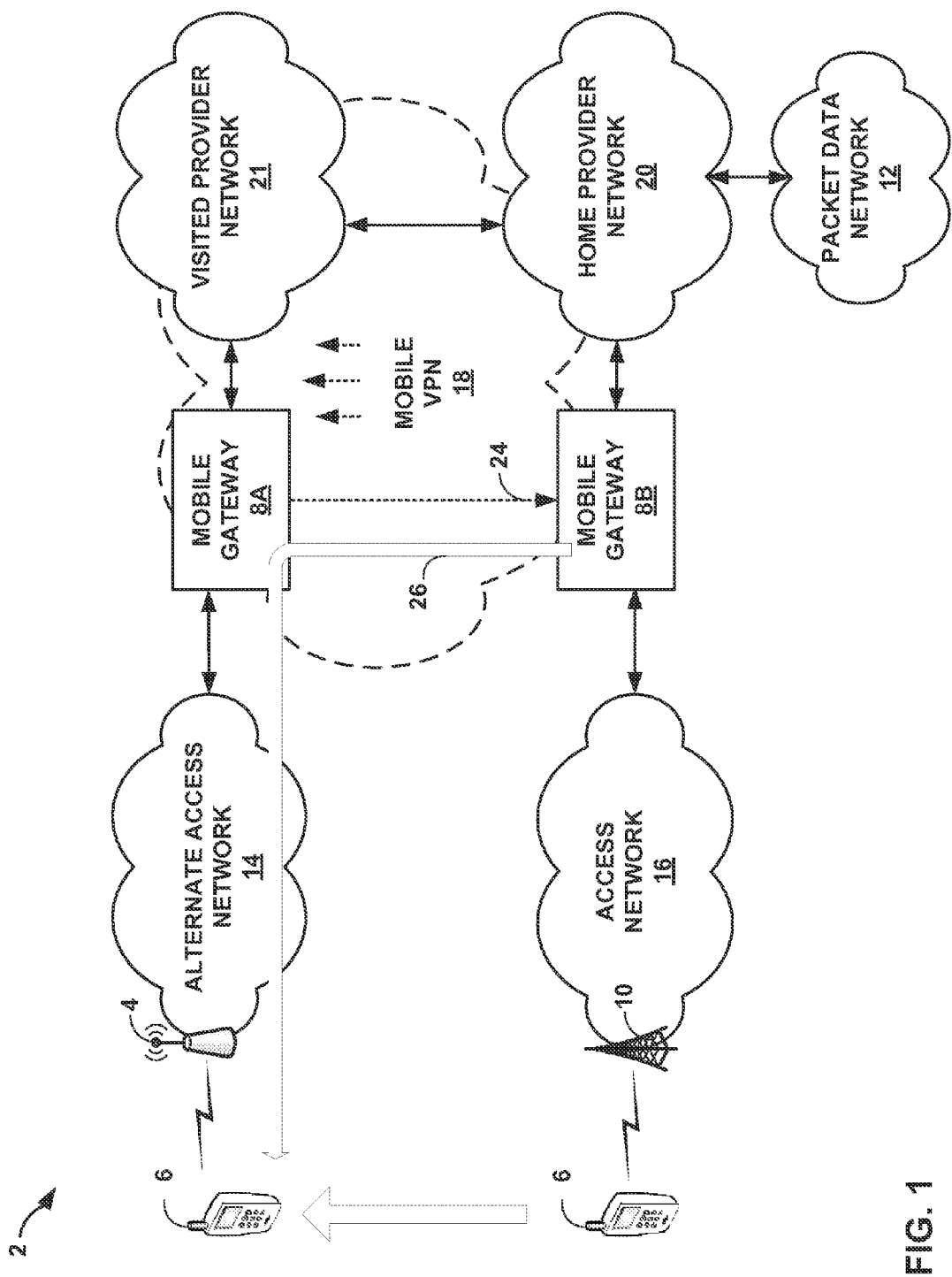
FIG. 1 is a block diagram illustrating an example network system that includes network components that establish and dynamically extend a mobile virtual private network (VPN) according to the described techniques.

FIG. 1 is a block diagram illustrating an example network system 2 that includes network components that establish and dynamically extend a mobile virtual private network (VPN) according to the described techniques. In this example, network system 2 comprises packet data network (PDN) 12 coupled to home provider network 20 to provide services to customers of the home provider network 20 provider. In this way, PDN 12 represents network devices and infrastructure that provide a "service plane" of home provider network 20. Packet data network 12 supports one or more packet-based services that are available for request and use by wireless device 6. As examples, PDN 12 may provide, for example, Internet access, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates home provider network 20, an enterprise IP network, or some combination thereof. Packet data network 12 executes one or more packet data protocols (PDPs), such as IP (IPv4 and/or IPv6), X.25 or Point-to-Point Protocol (PPP), to enable packet-based transport of PDN 12 services.

Home provider network 20 includes network elements and supporting functionality required to operate access network 16, including, but not limited to border gateway functions to PDN 12, charging and policy control functions, Deep Packet Inspection (DPI) and Lawful Intercept (LI) functions, authentication services, and access equipment. Home provider network 20 may represent a service provider (SP) network.

Wireless device 6 represents any mobile communication device that supports both cellular radio access and local radio (so called, "WiFi") network access, e.g., by way of any of the IEEE 802.11 communication protocols. Wireless device 6 may comprise, for example, a mobile telephone, a laptop or other mobile computer having, e.g., a 3G/4G wireless card, a smart phone, or a personal data assistant (PDA). Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments, as User Equipment (UE) or Mobile Stations (MS). One example of a wireless device utilizing services is described in U.S. patent application Ser. No. 12/967,977 filed Dec. 14, 2010, entitled "MULTI-SERVICE VPN NETWORK CLIENT FOR MOBILE DEVICE," incorporated herein by reference.

A service provider provisions and operates access network 16 and, in some cases, mobile gateway 8B to provide network access, data transport and other services to wireless device 6. In general, access network 16 and mobile gateway 8B may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GGP/2), the Internet Engineering Task Force (IETF), and the Worldwide Interoperability for Microwave Access (WiMAX) forum. For example, access network 16 and mobile gateway 8B may together represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Access network 16 and mobile gateway 8B may, alternatively or in conjunction with one of the above, implement a code division multiple access-2000 ("CDMA2000") architecture. Access network 16 and mobile gateway 8B may, again as an alternative or in conjunction with one or more of the above, implement a WiMAX architecture defined by the WiMAX forum. The service provider that operates home provider network 20 may be different than a provider/operator of access network 16 and mobile gateway 8B. That is, the relationship between the home provider network 20 service provider and the access network 16 service provider may be that of a provider and customer, respectively. The customer may be an Internet Service Provider (ISP), an application service provider, or another virtual private network (VPN) service provider. Alternatively, the same service provider may operate both home provider network 20 and access network 16.

Access network 16 may include a core packet-switched network and one or more radio access networks (also not shown in FIG. 1) that includes one or more base stations 10 to provide regional cellular access. A core packet-switched network of access network 16 may comprise, for example, a General Packet Radio Service (GPRS) core packed-switched network, or an Evolved Packet Core (EPC) or Evolved Packet System (EPS). The core packet-switched network of access network 16 comprises intermediate devices required to implement the protocols of the particular architectural embodiment of access network 16, such as Serving GPRS Serving Nodes (SGSNs) and Mobility Management Entities (MMEs). Wireless device 6 communicates with access network 16 using a wireless communication link to base station 10 of access network 16. Radio access networks of access network 16 may include, for example, a GSM Radio Access Network (GRAN), a WiMAX radio access network, a UMTS Radio Access Network (UTRAN), and/or an evolution of a UTRAN known as an E-UTRAN. Accordingly, base station 10 may represent a Node B or ENode B, for instance. Access network 16 may further make use of a backhaul or transport network (not shown) that includes land-based transmission lines, frequently leased by the service provider, to transport user and control traffic between wireless device 6 and mobile gateway 8l3. The backhaul network also includes network devices such as aggregation devices and routers.

Mobile gateway 8B is a network device that operates as a gateway and provides an interface to PDN 12 via home provider network 20. Mobile gateway 8B may, however, in some instances provide a direct interface to PDN 12. Mobile gateway 8B is therefore an endpoint for reference point SGi (LTE), Gi (3GPP), and Wi (non-3GPP) as described in 3GPP TS 23.402, "Architecture Enhancements for non-3GPP Accesses," Release 10, 3rd Generation Partnership Project, Technical Specification Group Services and System Aspects, June 2011, the entire content thereof being incorporated by reference herein.

Mobile gateway 8B may comprise, for example, a Gateway GPRS Serving Node (GGSN), an Access Gateway (aGW), or a Packet Gateway (P-GW). Alternatively, mobile gateway 8B may represent a network element that exchanges traffic between a wireless network deployment represented by access network 16 and home provider network 20. For example, mobile gateway 8B may represent may represent an interworking WLAN (I-WLAN) network element, a P-GW, a Packet Data Gateway (PDG) or enhanced PDG (ePDG), or a WLAN Access Gateway (WAG). In some embodiments, gateway 8B may include functionality for a provider edge (PE) router of home provider network 20. Additional information regarding wireless access networks may be found in 3GPP TS 23.234, "3GPP System to Wireless Local Area Network (WLAN) Internetworking," Release 10, 3rd Generation Partnership Project, Technical Specification Group Services and System Aspects, March 2011, the entire content thereof being incorporated by reference herein. While described herein with respect to one or more particular architectures for ease of illustration purposes, access network 16 and mobile gateway 8B may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Gateway 8B and elements of access network 16 may, therefore, each represent an abstraction of devices found within any type of mobile network architectures.

Access network 16 and mobile gateway 8B establish and operate an access channel for wireless device 6 to access the service-plane of home provider network 20 (represented in FIG. 1 by PDN 12). The access channel may represent, in accordance with different mobile access technologies, a packet data protocol (PDP) bearer or other bearer corresponding to a 3GPP or LTE architecture, a WiMAX channel, a CDMA2000 channel, or another non-3GPP access channel such as a WLAN link. To attach to access network 16, wireless device 6 initiates an attach request toward base station 10. The attach request may include a wireless identifier in the form of a device or subscriber identifier. The wireless identifier may include, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a Globally Unique Temporary Identity (GUTI), a subscriber username, an MSISDN number (e.g., a "Mobile Subscriber Integrated Services Digital Network Number"), an access point name (APN), a service provider identifier, Network Access Identifier, or other data or combination of the above-specified identifiers identifying a subscriber using wireless device 6. In one example, the wireless identifier is of the form username@mobilevpn.apn.homeprovider, where username identifies a particular subscriber seeking access to the service identified by apn and provided by the service provider for home provider network 20, which is identified by homeprovider.

Access network 16 passes the wireless identifier or a subset of the data included therein to mobile gateway 8B, which associates the access channel provisioned for wireless device 6 with the interface to PDN 12 via home provider network 20. Mobile gateway 8B may authenticate wireless device 6 to home provider network 20 using the wireless identifier received from wireless device 6. In addition, mobile gateway 8B allocates, or relays from home provider network 20, an IP address for wireless device 6 to use in exchanging IP packet belonging to IP traffic flows with PDN 12. Wireless device 6 uses the access channel and its allocated IP address to engage PDN 12 services.

Home provider network 20 supports mobile virtual private network (VPN) 18 with which customer edge (CE) devices, in this case represented by mobile gateways 8A-8B, served by home provider network 20 may exchange routes with other CE devices also served by home provider network 20. In one example, mobile VPN 18 is an IP-based VPN established and served by home provider network 20 such that mobile VPN 18 routes are distinct and separate from the default routing space of home provider network 20 as well as any other VPNs supported by the home provider network. One example of an IP-based VPN is described more fully in Rosen and Rekhter, "BGP/MPLS IP Virtual Private Networks (VPNs)", Request for Comments 4364, Network Working Group, February 2006, the entire contents of which being incorporated by reference herein.

Home provider network 20 uses route distribution protocols, such as Multi-Protocol Border Gateway Protocol (MP-BGP), to distribute routes specific to mobile VPN 18 that are advertised by edge routers of the mobile VPN 18 to other edge routers of the mobile VPN 18. In this example, home service provider network 20 assigns each route within mobile VPN 18 a Multiprotocol Label Switching (MPLS) label. Accordingly, edge routers of the mobile VPN 18 distribute an MPLS label with any advertised route.

When forwarding packets sourced by customer devices of mobile VPN 18, including wireless device 6, a PE router supporting mobile VPN 18 encapsulates the packets with the MPLS label that corresponds, in mobile VPN 18, to the route that is the best match to the destination address for the packet. This MPLS packet is further encapsulated (e.g., with another MPLS label and/or with an IP header) so that it gets tunneled across the home provider network 20 backbone to the proper edge router supporting mobile VPN 18. Thus, core routers of home provider network 20 do not need to know the VPN routes of mobile VPN 18, and the routes of mobile VPN 18 may remain distinct and separate from the default address space and the address spaces of other VPNs served by home provider network 20. As mobile gateway 8B provides an interface to home provider network 20 and, by extension, to mobile VPN 18 established by home provider network 20, mobile gateway 8B may alternately be referred to as a "home mobile gateway" (H-MGW).

Subsequent to being provisioned with an IP address, wireless device 6 attaches to alternate access network 14 via access point 4 to receive network services from visited provider network 21. Access point 4 may serve a particular location, such as a service provider or third-party hotspot, i.e., a commercial establishment that provides a wireless access point with which customers may establish a wireless access channel to utilize network services (e.g, Internet access). The location may also include a residency having a wireless access point, such as a wireless router, deployed to facilitate access to visited provider network 21. Accordingly, alternate access network 16 represents a wireless local area network that provides connectivity to visitor provider network 21 via mobile gateway 8A. Alternate access network 14 may include a non-cellular wireless access network such as a local area network (WLAN), WiMAX, or Femtocell network, for example, and includes access points, intermediate authentication, authorization, and accounting (AAA) elements and, in some instances, other devices such as routers. In these embodiments, access point 4 provides local radio communication to wireless device 6, e.g., by way of any of the IEEE 802.11 communication protocols, and thus operates as a WiFi or WiMAX "hotspot," Femtocell, or other wireless access point that serves as a bridge to the wired network infrastructure represented by alternate access network 14. Alternate access network 14 provides an access channel between wireless device 6 and mobile gateway 8A.

Visited provider network 21 may be a SP network operated by a service provider that is different than the service provider operating home provider network 20. The wireless device 6 subscriber may not be a customer of visited provider network 21, in which case wireless device 6 is illustrated as roaming to access point 4. That is, wireless device 6 connects to visited provider network 21 via alternate access network 14 without the subscriber having established a contractual or other arrangement with the visited provider network 21 service provider. In other words, there is only a transient relationship between the visited provider network 21 service provider, the home provider network 20 service provider, and the wireless device 6 subscriber. Mobile gateway 8A couples alternate access network 14 to visited provider network 21. Mobile gateway 8A may represent any of the example instances of a gateway device described above with respect to mobile gateway 8B. In some embodiments, wireless device 6 performs the functionality of mobile gateway 8A to connect itself mobile VPN 18. Visited provider network 21 and home provider network 21 communicate via network 13, which may represent a direct peering connection, a provider exchange, or more other autonomous systems (e.g., the Internet).

In accordance with the techniques of this disclosure, elements of network system 2 cooperate to dynamically extend mobile VPN 18 to the visited provider network 21 and thereby enable IP address continuity for wireless device 6 that has previously been allocated an IP address for connectivity via access network 16. Wireless device 6 provides a wireless identifier (e.g., username@moblievpn.apn.homeprovider) to mobile gateway 8A via alternate access network 14. Mobile gateway 8A signals visited provider network 21 to request connectivity to mobile VPN 18 of home provider network 20 specified by the wireless identifier. Upon receiving the wireless identifier, mobile gateway 8A and/or visited provider network 21 may authenticate wireless device 6 with a AAA device of home provider network 20 (not shown in FIG. 1), as described in further detail below.

Visited provider network 21 joins mobile VPN 18 by requesting and receiving routes specific to mobile VPN 18 from home provider network 20. Examples of the join procedure are described in detail below with respect to FIGS. 2-3. Mobile gateway 8A receives the IP address previously allocated to wireless device 6 for connectivity via access network 16 as a product of authentication with home provider network 20 or directly from wireless device 6. Because visited provider network 21 has joined mobile VPN 18, it receives base routes (including respective prefixes and next hop addresses) from home provider network 20. In addition, mobile gateway 8A sends route advertisement 24 specifying the received IP address prefix representing wireless device 6 to mobile VPN 18 (that is, to visited provider network 21 participating in mobile VPN 18). Visited provider network 21 and home provider network that implement mobile VPN 18 distribute the advertised route to mobile gateway 8B providing access to the home provider network 20 service plane (represented here by PDN 12). Mobile gateway 8A may also map the access channel provided by alternate access network 14 for wireless device 6 to an attachment circuit from mobile gateway 8A to visited provider network 20 that visited provider network 20 associates with mobile VPN 18. That is, visited provider network 20 associates traffic received on the attachment circuit from mobile gateway 8A with mobile VPN 18. In this way, network system 2 elements establish path 26 between wireless device 6 attached to alternate access network 14 and mobile gateway 8B.

After network system 2 dynamically extends mobile VPN 18 in this way, mobile gateway 8A becomes a visited gateway for wireless device 6. As mobile gateway 8A now provides an interface to mobile VPN 18 established by home provider network 20, mobile gateway 8A may alternately be referred to as a "visited mobile gateway" (V-MGW). Mobile gateway 8A may maintain a mapping table with identifiers for attached wireless devices, home network credentials, attachment circuits to one or more mobile VPN 18, and access information for each wireless device roaming onto alternate access network 14.

Mobile VPN 18 having been extended in accordance with the described techniques, mobile gateway 8B forwards service traffic from PDN 12 destined for the IP address of wireless device 6 toward mobile gateway 8A using routes specific to mobile VPN 18. Such traffic thus traverses path 26 established by network system 2 elements. Similarly, mobile gateway 8A uses mobile VPN 18 routes to forward IP traffic sourced by the IP address of wireless device 6 toward mobile gateway 8B for forwarding to PDN 12. Mobile gateway 8B may thus operate according to the techniques of this disclosure as a mobile gateway (e.g., a P-GW or GGSN) for wireless device 6 when the wireless device is attached to access network 16 and additionally as a PE router for wireless device 6 when the wireless device is attached to alternate access network 14. In some embodiments, however, mobile gateway (customer edge) and PE functionality of mobile gateway 8B is provided by distinct CE and PE devices.

By integrating mobility procedures at the network and traffic forwarding layer in this way, the techniques permit network system 2 to provide mobility at the fabric that makes up the Internet and intranets. As a result, techniques such as traffic engineering that are available for managing IP-MPLS networks may be applied by mobile gateway 8B and/or other elements of network system 2 to support access by way of alternate access network 14 that may implement a wireless architecture (e.g., WiFi) substantially different than the wireless architecture implemented by access network 16 (e.g., LTE). This advantage, in addition to IP address continuity for wireless device 6 when roaming among access networks, may therefore enable service providers to provide the user of wireless device 6 with an uninterrupted and substantially uniform user experience regardless of the attachment point of wireless device 6 to the network. The techniques may in this respect allow for a truly integrated mobile network within the mobile service provider's IP-MPLS network, rendering current "over-the-top" solutions based on overlay networks superfluous and simplifying the roaming infrastructure.

In addition, while described above with respect to a wireless device that roams from a cellular access network to a local WiFi network, the techniques may also be applied to extend a mobile VPN from a home provider network that offers a local WiFi network to a visited provider network that offers a cellular access network. As a result, a wireless device that roams from the local WiFi network to the cellular access network may maintain continuous service.

Figure 2:
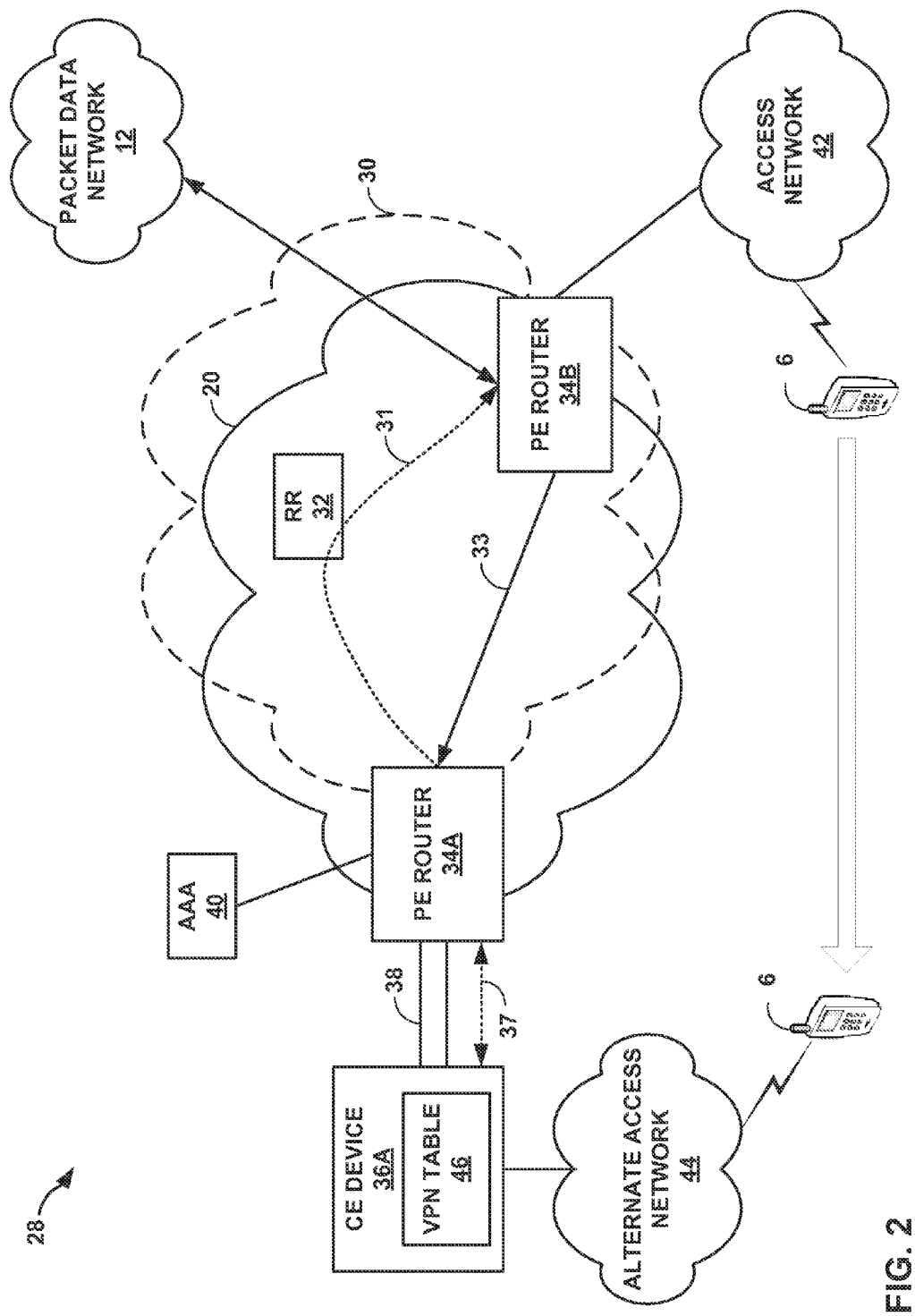
FIG. 2 is a block diagram illustrating an example network system that includes network components that establish and dynamically extend a mobile VPN according to the described techniques.

FIG. 2 is a block diagram illustrating an example network system 28 that includes network components that establish and dynamically extend a mobile VPN according to the described techniques. Network system 28 may represent an example embodiment of network system 2 of FIG. 1 that does not include a visited provider network. Network system 28 includes home provider network 20 and PDN 12 that may represent any of the aforementioned examples of corresponding entities described in relation to FIG. 1. Access network 42 and alternate access network 44 represent example embodiments of access network 16 and alternate access network 14 of FIG. 1.

In this example, home provider network 20 includes PE routers 34A, 34B ("PE routers 34") that provide edge connectivity for alternate access network 44 and access network 42, respectively. Home provider network 20 also includes route reflector 32 (illustrated as "RR 32") that cooperates with PE routers 34 to distribute routes for mobile VPN 30. PE routers 34 exchange routes via route reflector 32 using a route distribution protocol, such as internal BGP (IBGP) or multi-protocol IBGP (MP-IBGP). That is, each of PE routers 34 establishes a route distribution protocol peering session with route reflector 32 to send/receive routes for mobile VPN 30 with the other PE router.

PE routers 34 each participate in mobile VPN 30 by internally associating mobile VPN 30 with a VPN Routing and Forwarding instance (VRF) that has a forwarding table distinct from that of any other VRF of the PE router and from the PE router's default/global forwarding table. PE routers 34 exchange routes for respective customer sites served by the PE routers and members of mobile VPN 30 by tagging route advertisements for mobile VPN with a route target. In one example, PE routers 34 exchange routes tag routes for mobile VPN 30 with a BGP extended community attribute that specifies a route target for mobile VPN 30. PE routers 34 may create route target import and export lists for the VRF that specify the route targets associated with the VRF for the respective PE router. PE routers 34 attach route targets specified in a route target export list for the VRF to routes specific to the VRF and advertised to other PE routers. Likewise, when one of PE routers 34 receives an advertised route, the PE router compares the attached route target to the route target import list and imports routes having matching attached route targets to the VRF. In addition, mobile VPN 30 routes carry route distinguishers that ensure the address space for mobile VPN 30 remains distinct and separate from the default address space and the address space for any other VPN in which either of PE routers 34 participate. For example, PE routers 34 may include route distinguishers in MP-BGP route advertisements of mobile VPN 30 routes. Additional details regarding route target and route distinguisher usage may be found in Rosen and Rekhter, "BGP/MPLS IP Virtual Private Networks (VPNs)," incorporated above.

PE routers 34 also originate and terminate MPLS label switched paths (LSPs) and each PE router provides an MPLS label or other identifier with each advertised route. In other words, PE routers 34 exchange labeled mobile VPN 30 routes. When one of PE routers 34 receives an IP packet with an MPLS label, the PE router pops the MPLS label stack and processes the packet using the VRF associated with the popped label. In some instances, the VRF may be associated with a single label. In some instances, the label is specific to a particular route advertised by the VRF and to an egress interface of the receiving one of PE routers 34 for the route. The egress interface may include an interface to attachment circuit 38.

CE device 36A is an alternate gateway for alternate access network 44 to the provider edge and at least part of a visited mobile gateway (V-MGW) for mobile VPN 30. CE device 36A may represent an example embodiment of mobile gateway 8A of FIG. 1 and may comprise a network router or a layer two (L2) switch, for example. Since in some instances a visited access provider may support many home network providers simultaneously, the visited access provider needs a mechanism to distinguish the home providers of wireless devices and to route their respective traffic to the respective mobile VPNs of the home network providers. For instance, a WiFi hotspot serving many customers may route traffic onto the mobile VPNs for AT&T, Verizon Wireless, Vodafone Netherlands, or any of the other service providers when serving subscribers for these service providers.

VPN table 46 of CE device 36A associates service providers with VPN attachment circuits that couple CE device 36A with the associated service providers. In the illustrated example, attachment circuit 38 attaches CE device 36A to mobile VPN 30 by associating traffic carried by the attachment circuit with the mobile VPN in PE router 34A. That is, PE router 34A routes traffic received in attachment circuit 38 using mobile VPN 30. Attachment circuit 38 may include, for example, a point-to-point protocol (PPP) connection, Asynchronous Transfer Mode (ATM) Virtual Circuit (VC), Frame Relay VC, Ethernet interface, Virtual Local Area Networks (VLAN) on an Ethernet interface, GRE tunnel, Layer 2 Tunneling Protocol (L2TP) tunnel, or IPSec tunnel. To direct home provider network 20 to transport traffic using mobile VPN 30, CE device 36 sends the traffic to PE router 34A using attachment circuit 38 identified in VPN table 46 for home provider network 20 that establishes mobile VPN 30.

VPN table 46 may be administratively configured with service provider-attachment circuit associations or may be populated dynamically using associative data received from AAA server 40 (illustrated as "AAA 40") in a protocol exchange, either directly with CE device 36A operating as a AAA proxy or via PE router 34A operating as a AAA proxy.

In one example, wireless device 6 attaches to alternate access network 44, having been previously attached to access network 42 and provisioned with an IP address by home provider network 20, and provides a wireless identifier to CE device 36A. CE device 36A determines a service provider identity (in this case, an identity of the home provider network service provider) from the wireless identifier and uses the service provider identity as a lookup key to VPN table 46. If VPN table 46 includes an association for the service provider identity, CE device 36A maps the interface to the access channel over alternate access network 44 for wireless device 6 with an attachment circuit specified by the association. In the illustrated example, the service provider identity identifies home provider network 20 implementing mobile VPN 30. Accordingly, CE device 36A associates the access channel interface for wireless device 6 with mobile VPN 30 by mapping the access channel interface to attachment circuit 38 and to the IP address of wireless device 6. If VPN table 46 does not include an association for the service provider identity, CE device 36A may request specifications for an attachment circuit to mobile VPN 30 from AAA 40, for example. CE device 36A dynamically establishes attachment circuit 38 to mobile VPN 30 according to specifications received responsive to the request.

In addition, CE device 36A learns the IP address previously allocated by home provider network 20 to wireless device 6 when the wireless device previously attached to access network 42. CE device 36A may learn the IP address from AAA device 40 or directly from wireless device 6. PE router 34A learns that the IP address of wireless device 6 is reachable by CE device 36A by receiving the IP address in a routing or reachability protocol message, for example. Additional techniques by which PE router 34A may learn the IP address for wireless device 6 are found in Rosen and Rekhter, "BGP/MPLS IP Virtual Private Networks (VPNs)", section 7. For example, PE router 34A and CE device 36A may peer using an interior gateway protocol (IGP) and exchange routes over IGP peering link 37. PE router 34A may map the IP address to attachment circuit 38.

PE router 34A joins mobile VPN 30 if it has not already done so and creates a VRF for the mobile VPN 30 if necessary. To join mobile VPN 30, PE router 34 learns the route target associated with mobile VPN 30, from CE device 36A or from AAA 40 and may install this route target to the VRF import and export lists. This ensures that PE router 34A receives mobile VPN 30 routes, such as routes to PDN 12 available via. PE router 34B. PE router 34A then sends route advertisement 31 including the wireless 6 IP address prefix, an MPLS label, and a route target for mobile VPN 30. The MPLS label identifies LSP 33 over home provider network 30 toward PE router 34A. Route reflector 32 distributes route advertisement 31 to PE router 34B, which installs the route and label to its VRF for mobile VPN 30. In this way, PE router 34B may replace an outbound interface for wireless device 6 toward access network 42 with an outbound interface for LSP 33. PE routers 34 may use MP-BGP to distribute labeled routes.

PE router 34B, as the anchor point for wireless device 6 for PDN 12, receives service traffic destined for wireless device 6. PE router 34B maps the destination IP address for the service traffic to its VRF for mobile VPN 30 and to LSP 33, and the PE router attaches the appropriate label to and forwards the service traffic toward PE router 34A. PE router 34A pops and inspects the label and maps the label to the VRF for mobile VPN 30, which includes a mapping to attachment circuit 38 for the destination IP address (i.e., the wireless device 6 IP address). CE device 36A then forwards traffic received on attachment circuit 38 for mobile VPN 30 toward wireless device 6 by selecting the appropriate access channel over alternate access network 44 for the IP address using the previously established mapping. CE device 36A forwards traffic sourced by wireless device 6 to PE router 34A over attachment circuit 38, which associates the traffic with mobile VPN 30 within PE router 34A to cause PE router 34A to route the traffic toward PE router 34B that provides access to PDN 12 prefixes. In addition, when PE router 34B operates as a mobile gateway (e.g., a GGSN/P-GW), PE router 34B may apply provider-level services to the service traffic, such as charging and policy control, Deep Packet Inspection (DPI), and Lawful Intercept (LI).

Figure 3:
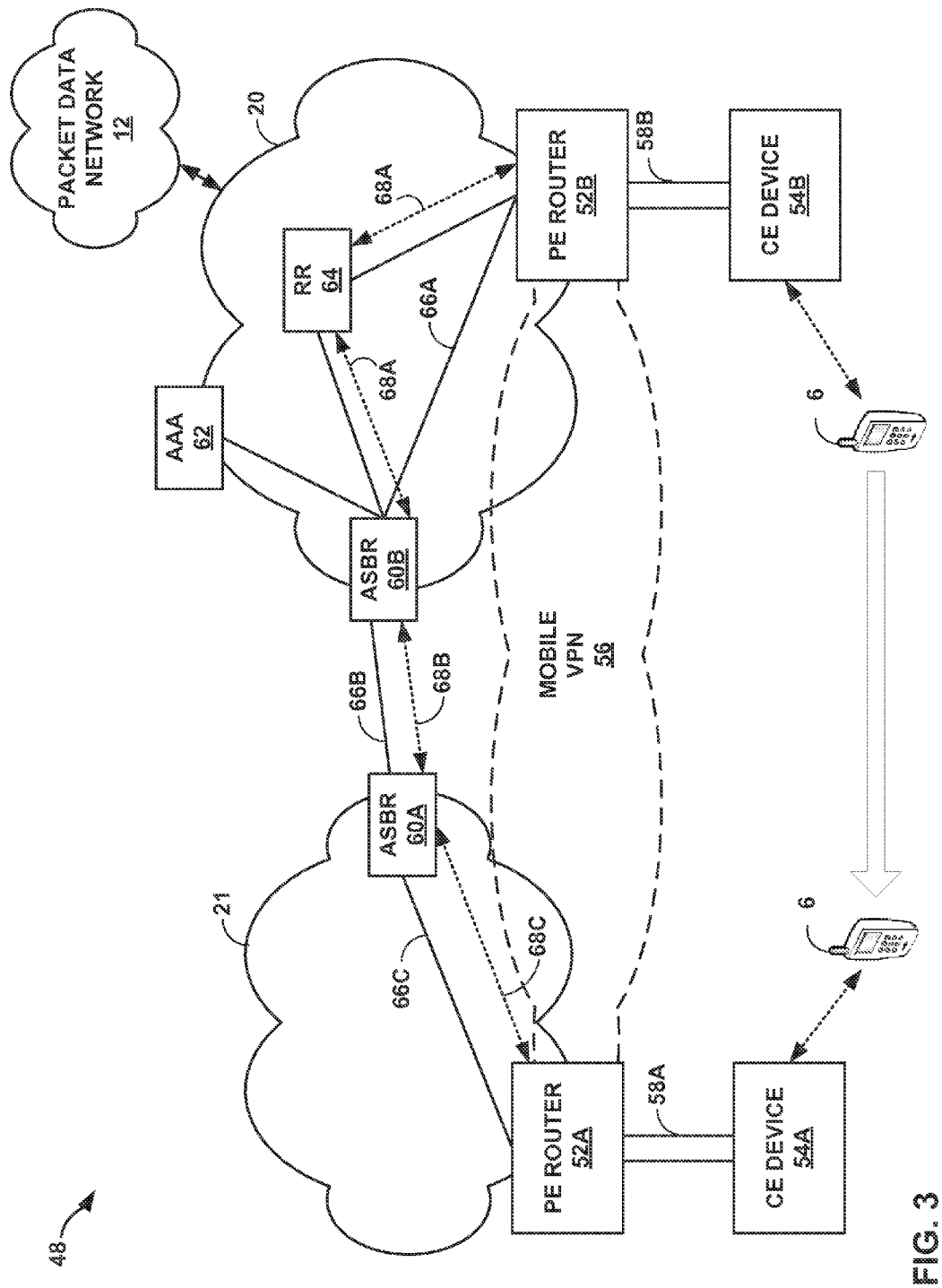
FIG. 3 is a block diagram illustrating network system that includes components that establish and dynamically extend a mobile virtual private network VPN according to the described techniques.

FIG. 3 is a block diagram illustrating network system 48 that includes components that establish and dynamically extend a mobile VPN according to the described techniques. Network system 48 may represent an example embodiment of network system 2 of FIG. 1. As such, network system 48 includes home provider network 20, visited provider network 21, wireless device 6, and PDN 12 that may represent any of the aforementioned examples of corresponding entities described in relation to FIG. 1. Access networks by which wireless device 6 attains connectivity to provider networks are represented by CE devices 54A-54B that are access network gateways for ease of illustration purposes.

In this example, home provider network 20 establishes mobile VPN 56 to provide a universal roaming solution for wireless devices seeking access to PDN 12 services. Wireless device 6 initially accesses mobile VPN 56 via CE device 54B (a customer gateway) and PE router 52B of home provider network 20. Home provider network 20 assigns or relays from PDN 12 an IP address to wireless device 6 prior to wireless device 6 roaming to the access network for which CE device 54A operates as a gateway. In this example, visited provider network 21 and home provider network 20 use BGP signaling and a label distribution protocol (e.g., Label Distribution Protocol (LDP) or Resource Reservation Protocol (RSVP)) to dynamically extend mobile VPN 56 toward CE device 54A and MPLS transport techniques in combination with associated attachment circuit 58A to transport traffic between PDN 12 and roaming wireless device 6. CE device 54A may therefore represent an embodiment of mobile gateway 8A of FIG. 1. CE device 54A connects to mobile VPN 56 using attachment circuit 58A to PE router 52A using techniques described above with respect to FIG. 2, for instance. Similarly, CE device 54B connects to mobile VPN 56 using attachment circuit 58B to PE router 52B.

Home provider network 20 includes PE router 52B and autonomous system border router (ASBR) 60B that establish respective MP-IBGP peering links 68A with route reflector 64 (illustrated as "RR 64") to exchange mobile VPN 56 routes and thereby implement mobile VPN 56. PE router 52B and ASBR 60B exchange data traffic for mobile VPN 56 using bidirectional MPLS tunnel 66A. PE router 52B may advertise itself as a next hop router for prefixes of PDN 12 with a labeled route advertisement using MP-IBGP peering links 68A, where the route target identifies a VRF on PE router 52B corresponding to mobile VPN 56. Visited provider network 21 includes PE router 52A and ASBR 60A that also establish MP-IBGP peering link 68C with which to exchange labeled route advertisements. Some instances of visited provider network 21 may include a route reflector utilized by PE router 52A and ASBR 60A to exchange routes.

ASBR 60A and ASBR 60B ("ASBRs 60") have a direct peering relationship over multi-protocol external BGP (MP-EBGP) peering link 68B that enables ASBRs 60 to exchange labeled routes. Because both home provider network 20 and visited provider network 21 represent autonomous systems, MP-EBGP peering link 68B is an inter-autonomous system (inter-AS) link.

Wireless device 6, subsequent to receiving an IP address from home provider network 20, attaches to CE device 54A and provides wireless identifier to CE device 54A to attempt to connect to mobile VPN 56 of home provider network 20. Wireless device 6 typically authenticates to CE device 54A using, for example, Extensible Authentication Protocol (EAP)-Transport Layer Security (TLS), EAP-Subscriber Identity Module (EAP-SIM), or EAP-Authentication and Key Agreement (EAP-AKA), e.g., as part of an IEEE 802.1x authentication cycle, and may result in wireless device 6 providing its pre-provisioned IP address to CE device 54A.

CE device 54A or PE router 52A operates as a AAA proxy for AAA 62 of home provider network 20 to receive a route target for the wireless identifier with which PE router 52A can signal interest in receiving mobile VPN 56 routes. Specifically, PE router 52A joins mobile VPN 56 by issuing an MP-IBGP update that specifies the route target via MP-IBGP peering link 68C to ASBR 60A. ASBR 60A issues, in turn, an MP-EBGP update that specifies the route target to ASBR 60B. Thereafter, ASBRs 60 exchange labeled routes for mobile VPN 56 and ASBRs 60 exchange packets for mobile VPN 56 across bidirectional MPLS tunnel 66B in accordance with the exchanged labels. In some embodiments, rather than direct peering, ASBRs 60 communicate via a provider exchange (described further with respect to FIG. 4) or over a tunnel (e.g., a GRE tunnel) by which ASBR 60A may stitch a local VPN for visited provider network 21 to mobile VPN 56 and so extend mobile VPN 56 toward CE device 54A.

PE router 52A and ASBR 60A then exchange labeled routes for mobile VPN 56 using MP-IBGP peering link 68C to enable PE router 52A and ASBR 60A to exchange packets for mobile VPN 56 across bidirectional MPLS tunnel 66C. To notify home provider network 20 of the new attachment point for wireless device 6, PE router 52A advertises a labeled route that includes the IP address prefix pre-provisioned for wireless device 6 toward ASBR 60A, which distributes the labeled route toward home provider network 20. In this way, network system 48 dynamically extends mobile VPN 56 to CE device 54A to allow wireless device 6 to exchange service traffic with PDN 12 via PE router 52B using an IP address allocated by home provider network 20 despite being attached to visited provider network 21. As a result, wireless device 6 served by home provider network 20 may relocate with reduced interruption in service compared to conventional techniques, and home provider network 20 may continue to obtain service traffic flows of wireless device 6 to apply enhanced services. Home provider network 20 may therefore be able in some instances to provide service to wireless device 6 without being constrained by the geographical limitations of home provider network 20. Further, rather than connecting over an access-specific (e.g., a GPRS Tunneling Protocol (GTP)) exchange such as a GPRS Roaming Exchange (GRX), the techniques reconnect wireless device 6 to home provider network 20 over an IP-based infrastructure, which may enable providers to simplify and/or consolidate their roaming interfaces.

Figure 4:
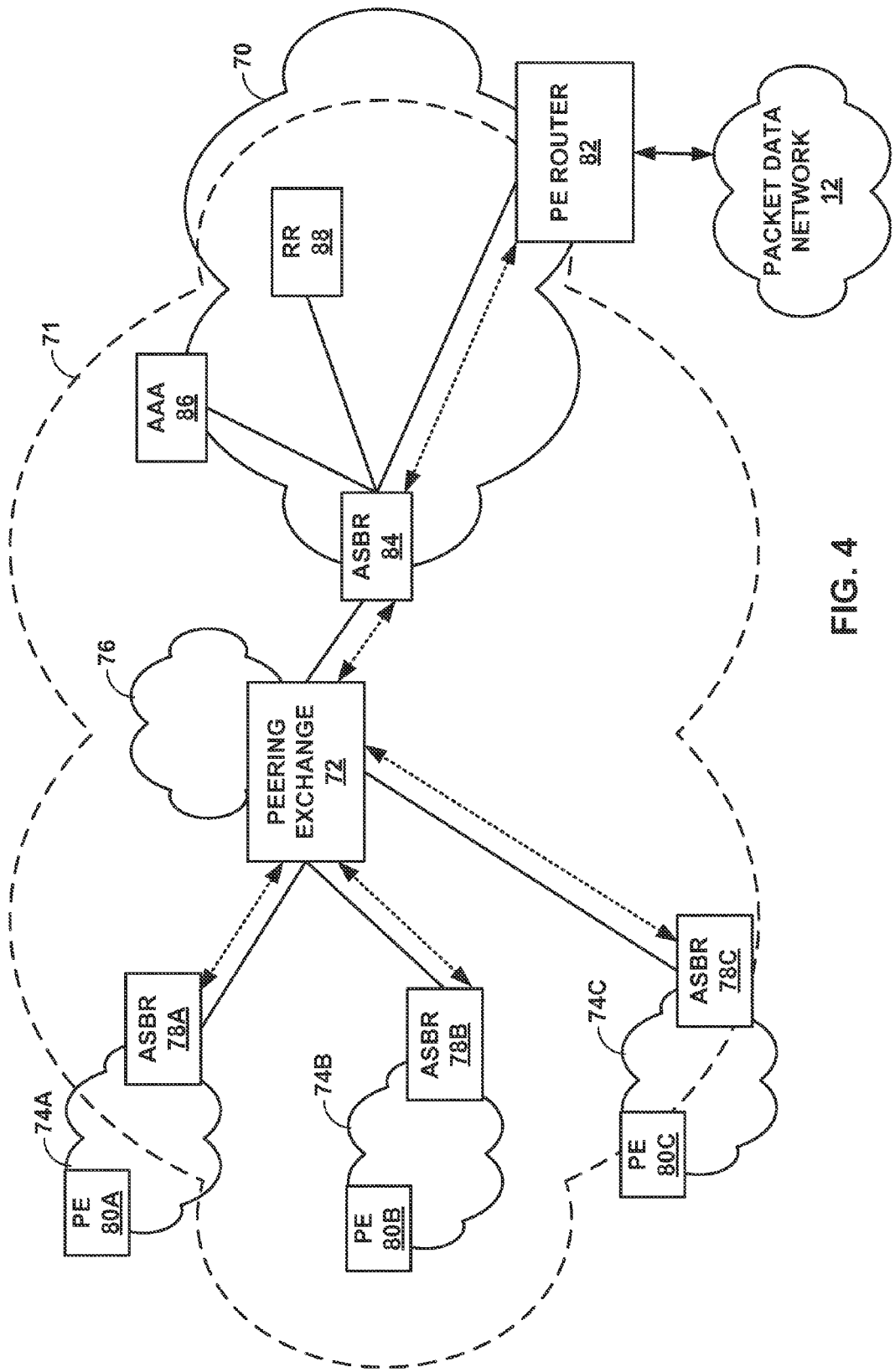
FIG. 4 is a block diagram illustrating service provider networks that use techniques herein described to connect to a mobile VPN using a peering exchange in accordance with techniques describes in this disclosure.

FIG. 4 is a block diagram illustrating service provider networks 74A-74C ("SP networks 74") that use techniques herein described to connect to mobile VPN 71 of home provider network 70 using a peering exchange in order to provide IP address continuity to wireless devices that roam to SP networks 74 from home provider network 70. Home provider network 70 may represent an example embodiment of home provider network 20 of FIG. 1, and home provider network 70 establishes mobile VPN 71 using techniques described above to provide IP-based roaming connectivity to wireless devices. Each of SP networks 74 may represent an embodiment of visited provider network 21 of FIG. 1 and provides access to wireless devices via access networks, such as alternate access network 14 of FIG. 1, coupled to respective PE routers 80A-80C. Home provider network 70 may be a tier-1 service provider.

Peering exchange 72 (alternatively, "provider exchange 72") operating within network 76 provides a single point of connectivity between any pair of providers (i.e., between any pair of SP networks 74 and home provider network 70. Peering exchange 72 may include a router that executes MPLS and MP-BGP to provide signaling for dynamically extending mobile VPN 71 towards any of SP networks 74. Peering exchange 72 internalizes the MP-BGP signaling that would otherwise be performed by home provider network 20 for each of SP networks 74 that include an attached wireless device seeking access to mobile VPN 71. In other words, management of mobile VPN 71 of home provider network 70 is performed by peering exchange 72, including mapping of the provider identifiers onto a route target for mobile VPN 71, outbound route filter (ORF) management, and charging/billing. Peering exchange 72 thereby transparently extends mobile VPN 71 toward SP networks 74 on behalf of home provider network 70.

For example, peering exchange 72 may directly peer with ASBR 84 in a MP-EBGP peering relationship to exchange labeled routes for mobile VPN 71. Thereafter, as wireless devices that subscribe to home provider network 70 roam to SP networks 74, peering exchange 72 directly peers with the respective ASBRs 78A-78C of the SP networks to relay mobile VPN 71 routes between ASBRs 78 and ASBR 84 as needed. Peering exchange 72 may maintain a VPN table, for example VPN table 46 described with respect to FIG. 2, to associate provider identifiers with route targets for corresponding mobile VPNs for the providers. In this way, peering exchange 72 may reduce the number of peering relations among home provider network 70 and alternate access networks such as SP networks 74.

Figure 5:
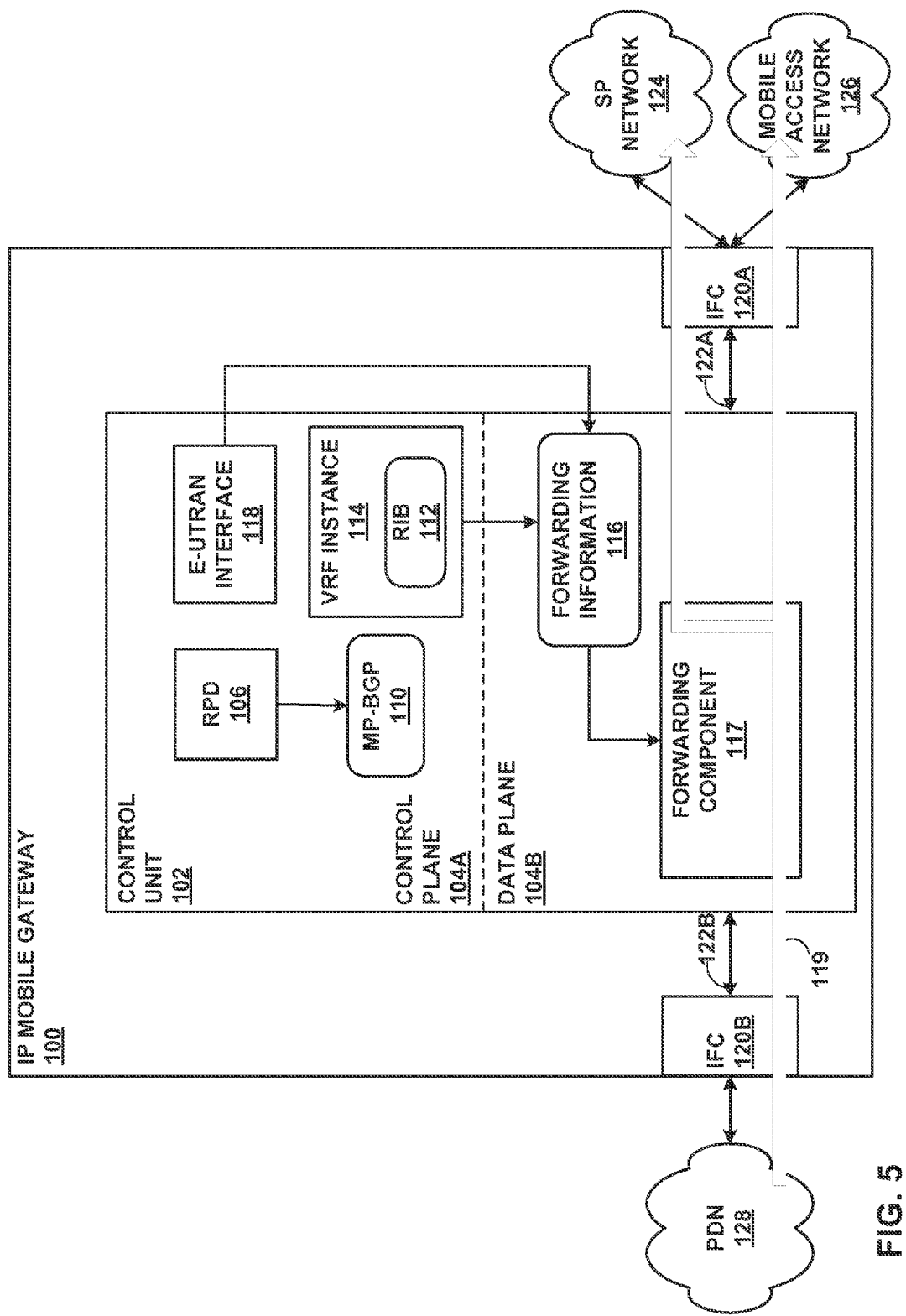
FIG. 5 is a block diagram illustrating a IP mobile gateway that integrates a gateway functionality for an access network with provider edge router functionality for a provider network to dynamically extend a mobile VPN in accordance with the techniques of this disclosure.

FIG. 5 is a block diagram illustrating a IP mobile gateway 100 ("IP-MGW 100") that integrates a gateway functionality for an access network with provider edge router functionality for a provider network to dynamically extend a mobile VPN in accordance with the techniques of this disclosure. IP-MGW 100 may represent mobile gateway 8B of FIG. 1. IP-MGW 100 may also represent an example embodiment of any of PE routers of FIGS. 2-4. Moreover, while described with respect to a particular network device, e.g., a router, the techniques may be implemented by any network device that may operate to perform the functionality herein described. Furthermore, while the functionality is illustrated as integrated within a single IP-MGW 100, the functionality may be distributed between multiple devices, e.g., between a PE router and a PGW. The techniques should therefore not be limited to the exemplary embodiments described in this disclosure.

IP-MGW 100 includes a control unit 102 and interface cards 120A-120B ("IFCs 120") coupled to control unit 102 via internal links 122A-122B. Control unit 102 may comprise one or more processors (not shown in FIG. 5) that execute software instructions, such as those used to define a software or computer program, stored to a computer-readable storage medium (again, not shown in FIG. 5), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Interface cards 120 provide inbound and outbound interfaces with PDN 128, service provider (SP) network 124, and wireless access network 126. PDN 128 represents an example embodiment of PDN 12 of FIG. 1, SP network 124 represents an example embodiment of home provider network 20 of FIG. 1, and wireless access network 126 represents an example embodiment of access network 16 of FIG. 1. Wireless access network 126 is described hereinafter as an E-UTRAN network for an LTE network that is an access network to SP network 124 operated by a service provider.

In this example, control unit 102 is divided into two logical or physical "planes" to include a first control or routing plane 104A and a second data or forwarding plane 104B. That is, control unit 102 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 104A of control unit 102 executes the routing and signaling functionality of IP-MGW 100. In this respect, control plane 104A represents hardware or a combination of hardware and software of control unit 102 that executes routing protocols such as MP-BGP 110 by which routing information may be received, advertised, processed, and stored in routing information base 112 ("RIB 112") of VPN routing and forwarding (VRF) instance 114. RIB 112 includes information defining a topology of a mobile VPN that is associated with a route target corresponding to VRF instance 114. That is, VRF instance 114 defines participation by IP-MGW 100 in a mobile VPN established by service provider network 124 for which IP-MGW 100 operates as a PE router. Control plane 104A may resolve the topology defined by routing information in RIB 112 to select or determine one or more routes through the mobile VPN. Control plane 104A may then update data plane 104B with these routes, where data plane 104B maintains these routes within forwarding information 116. In this example, forwarding information 116 includes ingress and egress MPLS labels defining MPLS tunnels that terminate at VRF instance 114 or a VRF instance for the mobile VPN on a receiving device. Control plane 104A may also define a default routing and forwarding instance as well as one or more additional VRF instances (not shown) for routing and forwarding in networks other than the mobile VPN.

Data plane 104B represents hardware or a combination of hardware and software of control unit 102 that provides high-speed forwarding of network traffic received by interface cards 120 in accordance with forwarding information 116. Forwarding component 117 of data plane 104B performs lookups in forwarding information 116 based on packet key information for received packets to determine ingress and egress interfaces and corresponding encapsulations for the packets. Forwarding component 117 may include a packet forwarding engine.

E-UTRAN interface 118 is a downstream access network interface that allows IP-MGW 100 to operate as an LTE gateway, such as a PDN gateway, serving gateway (SGW), or combination thereof for wireless access network 126 representing an E-UTRAN or another type of cellular access network. E-UTRAN interface 118 may connect to reference point S1 and S1-U to provide user plane tunneling and tunnel management between IP-MGW 100 and wireless access network 126. E-UTRAN interface 118 exchanges control messages with a mobility management entity (MME) to receive Evolved Packet System (EPS) or Packet Data Protocol (PDP) bearer context information for attached wireless devices. Such context information includes tunnel endpoint identifiers (TEIDs) and network addresses of downstream eNode Bs for forwarding service traffic to/from the access channel for the wireless devices over wireless access network 126. For example, the context information may define specifies downstream S1-U bearer parameters. E-UTRAN interface 118 maps the context information to respective IP addresses for the wireless devices and installs the context information to forwarding information 116. In this way, IP-MGW 100 may connect to reference point SGi to provide bearers for respective wireless devices for relaying IP traffic that IP-MGW 100 exchanges with SP network 124. LTE network references and techniques are described more fully in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, which is incorporated herein by reference in its entirety.

Subsequent to attaching to wireless access network 126 and being provisioned with an IP address by SP network 124, a wireless device may attach to an alternate access network (e.g., any example embodiment of alternate access network 14 of FIG. 1, described above). SP network 124 performs techniques described above to extend the mobile VPN toward the alternate access network and, in addition, advertises in a MP-BGP 110 message a route received from the alternate access network that includes a VRF instance 114 route target. The route includes a prefix corresponding to the IP address of the wireless device as well as an MPLS label and a next hop router that is a router (typically, an ASBR) within SP network 124. For IPv4 networks, the prefix is a /32 route. For IPv6 networks, the prefix is a /128 route.

Accordingly, VRF instance 114 installs the labeled route to RIB 112 then generates forwarding information based on the labeled route. The forwarding information associates the MPLS label and an outbound interface of IFC 120A toward the next hop router of SP network 124 with the IP address corresponding to the prefix received in the labeled route. VRF instance 114 installs the forwarding information to forwarding information 116 such that the forwarding information defines operations to be performed by forwarding component 117 for subscriber traffic that is destined for the IP address. In doing so, VRF instance 114 may supplant forwarding information previously installed by E-UTRAN interface 118 that mapped a bearer for wireless access network 126 to the IP address, thus reflecting the migration of the wireless device from wireless access network 126 to an alternate access network remotely connected via SP network 124.

As a result, when IFC 120B of IP-MGW 100 receives service traffic 119 from PDN 128 on an inbound interface, forwarding component 117 forwards the traffic toward either SP network 124 or wireless access network 126 based on forwarding information 116. If the service traffic 119 is destined for an IP address of a wireless device attached to wireless access network 126, forwarding information 117 maps context information for a bearer over wireless access network 126 to the IP address, and forwarding component 117 forwards service traffic 119 to the wireless device in accordance with the context information. If, however, the wireless device is attached to an alternate access network for which IP-MGW 100 is not a gateway, then forwarding information 117 directs forwarding component 117 to push a mapped MPLS label, received in a labeled route specifying the IP address prefix, onto the packets of the service traffic, and forward the service traffic using the outbound interface toward SP network 24. In this way, IP-MGW 100 may provide a single-node LTE solution that integrates functionality of a P-GW and/or S-GW for wireless access network 126 with the functionality of PE router for SP network 124 that provides a mobile VPN. A single-node LTE solution may simplify mobile VPN deployment by internalizing LTE reference points within IP-MGW 100. Furthermore, by deploying multiple such IP-MGWs 100 within an SP network and migrating bearer contexts among the multiple IP-MGWs, a service provider may enable geographic redundancy of anchoring gateways for cellular access networks, which may reduce service traffic latency.

Figure 6A:
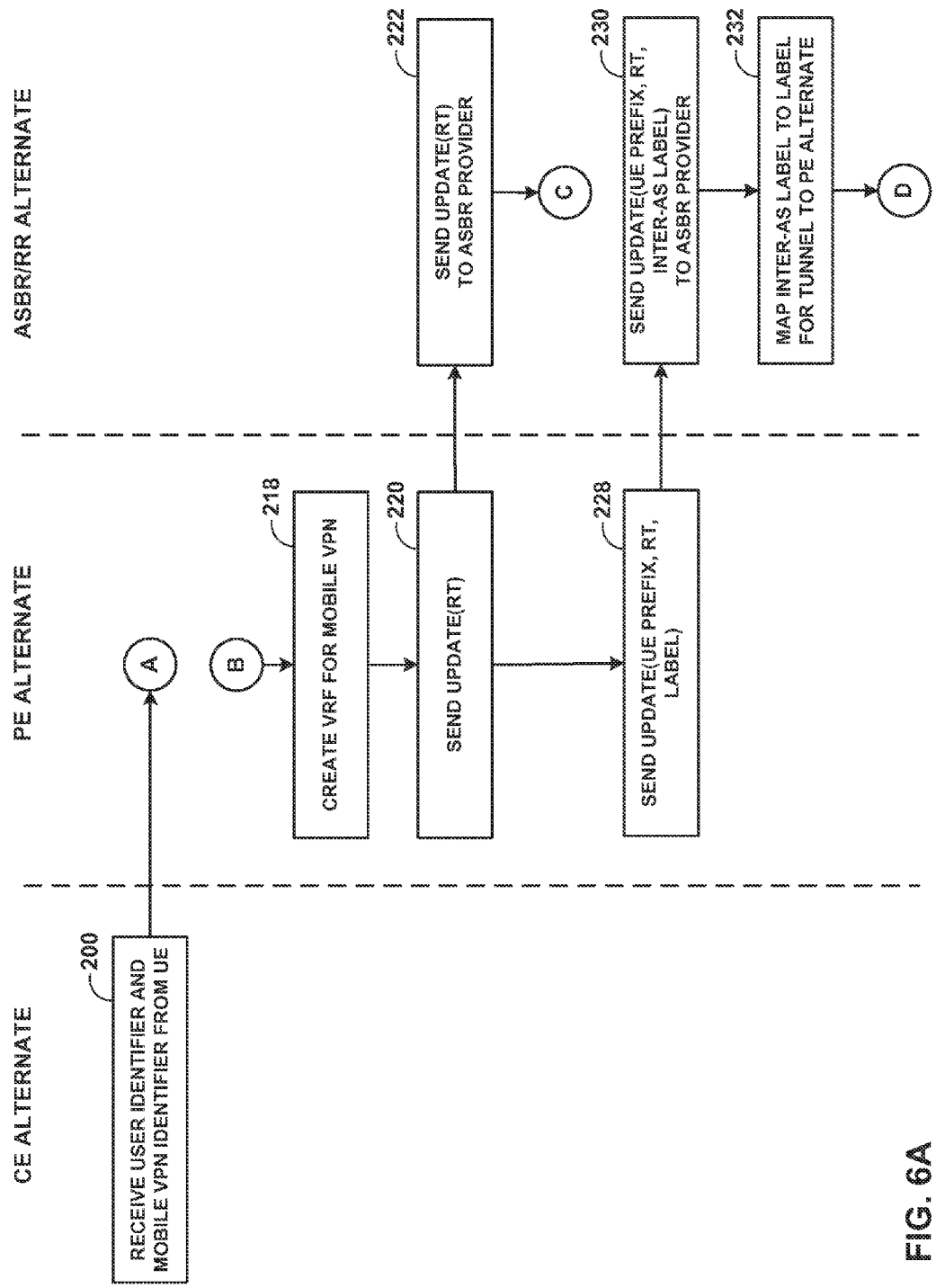
Figure 6B:
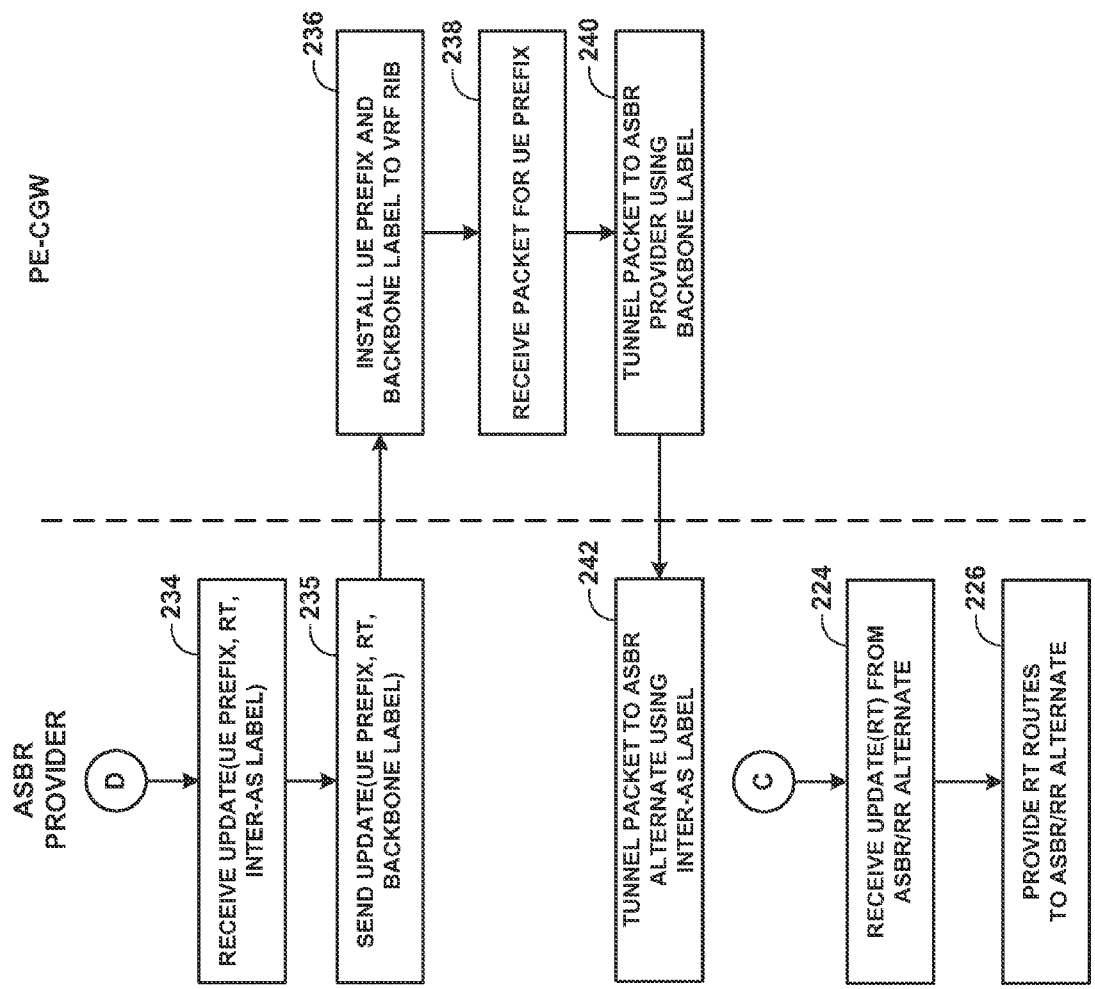

FIGS. 6A-6C illustrate flowcharts representing example modes of operation of network system components to dynamically extend a mobile VPN to facilitate wireless device roaming and connectivity continuity according to techniques described in this disclosure. For purposes of illustration, the network system components operating to execute the operation steps are described with reference to components of network system 48 of FIG. 3. However, the modes of operation represented in the flowcharts may be performed in additional network system configurations having components capable of performing the requisite steps.

Initially, a user equipment (UE) (e.g., a wireless device) attaches to an alternate access network for which CE device 54A operates as a CE alternate gateway. CE device 54A receives a wireless identifier from the UE that specifies a user identifier and a mobile VPN identifier (200). The mobile VPN identifier may specify a particular service provider, for instance. CE device 54 shares the wireless identifier with alternate PE router 52A of visited provider network 21, which uses the mobile VPN identifier to request access for the identified user from AAA device 62 of home provider network 20 that established the identified mobile VPN (202). In the illustrated example, PE router 52A sends or forwards a Remote Authentication Dial-In User Service (RADIUS) or Diameter attach request message that specifies the user identifier to AAA device 62 (204), which authenticates the identified user and performs a security handshake with the UE using security protocol messages relayed by PE router 52A and CE device 54 (206). Upon authentication and authorization, AAA device 62 returns to PE router 52A an IP address for the UE previously allocated to the UE by home provider network 20 and additionally returns a route target for mobile VPN 56 (208). In some instances, PE router 52A receives the IP address directly from UE.

PE router 52A determines whether it has established an attachment circuit for mobile VPN 56 (210) and, if not (NO branch of 210), establishes the attachment circuit and provides the attachment circuit parameters to CE device 54 (212). PE router 52A forwards the IP address received from AAA device 62 downstream to CE device 54 (214), which forwards the IP address to the UE (216). PE router 52A, if necessary, creates a VPN routing and forwarding (VRF) instance for the mobile VPN (218). The VRF uses an MP-BGP UPDATE message to request, either directly or by using a route reflector, ASBR 60A of visited provider network 21 to send routes for the route target to PE router 52A and so join the mobile VPN (220).

ASBR 60A additionally uses an MP-BGP UPDATE message to request ASBR 60B to send routes for the route target to ASBR 60A (222). ASBR 60B receives the UPDATE message from ASBR 60A and provides any routes for the route target included therein to ASBR 60A (226).

Subsequent to sending the route target to ASBR 60A, PE router 52A sends a labeled route, specifying an IP prefix for the UE IP address and a label that identifies an MPLS tunnel to PE router 52A, to ASBR 60A (228). ASBR 60A installs the labeled route to its routing table and sends, in a labeled route, the IP prefix to ASBR 60B together with an inter-AS label that identifies an inter-AS MPLS tunnel to ASBR 60A (230). ASBR 60A also maps the inter-AS label to the MPLS tunnel to PE router 52A to stitch the inter-AS MPLS tunnel to the MPLS tunnel (232).

ASBR 60B receives the labeled route from ASBR 60A and installs the labeled route to its routing table (234). ASBR 60B, in turn, sends to PE router 52B a labeled route specifying a backbone label for a home provider network 20 backbone MPLS tunnel to ASBR 60B and the UE IP prefix (235). ASBR 60B may map the backbone label to the inter-AS label to stitch the backbone MPLS tunnel to the inter-AS MPLS tunnel. PE router 52B receives and installs the labeled route to the VRF for mobile VPN 56 (236). Subsequently, PE router 52B receives a packet for the IP address prefix (238) and tunnels the packet to ASBR 60B using the backbone label for the IP address prefix (240). ASBRs 60 forward the packet along successive MPLS tunnels to PE router 52A (242).

Figure 7:
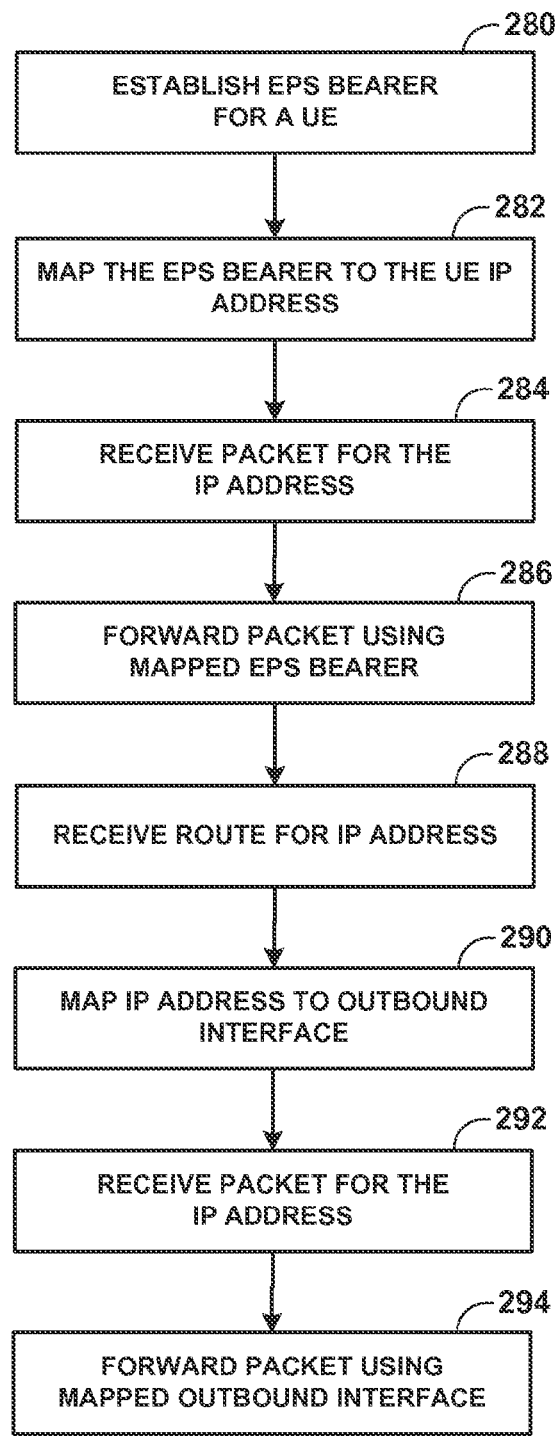
FIG. 7 is a flowchart representing an example mode of operation for the IP-MGW of FIG. 5 to support both 3GPP and mobile VPN access for a user equipment (UE) to provide seamless connectivity to a unified service plane.

FIG. 7 is a flowchart representing an example mode of operation for IP-MGW 100 of FIG. 5 to support both 3GPP and mobile VPN access for a user equipment (UE) to provide seamless connectivity to a unified service plane. In this example, E-UTRAN interface 118 establishes an EPS bearer over wireless access network 126 for the UE (280) and maps the EPS bearer to the IP address for the UE in forwarding information 116 (282). When IFC 120B receives a downstream packet specifying the IP address for the UE (284), forwarding component 117 forwards, based on forwarding information 116, the downstream packet using the EPS bearer (286).

Subsequently, the UE attaches to an access network for a visited provider network, and VRF instance 114, participating in a mobile VPN according to techniques described above, receives from RPD 106 a route for the IP address of the UE from SP network 124 (288). VRF instance 114 maps the IP address of the UE to an outbound interface toward the next hop for the route and installs the mapping to forwarding information 116 to displace the mapping of the IP address to the EPS bearer (290). Consequently, when IFC 120B receives a subsequent downstream packet specifying the IP address for the UE (292), forwarding component 117 forwards, based on forwarding information 116, the downstream packet using the mapped outbound interface (294).

FIG. 8 is an associative data structure, here illustrated as mobile VPN table 300, that includes entries 302A-302C ("entries 302") to map respective attachment circuits to service provider identifiers. Mobile VPN table 300 may represent an example instance of VPN table 46 of FIG. 2. The provider identifier field ("provider ID") for each of entries 302 may include, for example, a name of a service provider, an autonomous system identifier (AS ID), or a Uniform Resource Identifier (URI). The attachment circuit field ("AC") for each of entries 302 specifies an attachment circuit interface that includes parameters for application to packets for forwarding to a corresponding mobile VPN provided by the associated service provider. As a result, when a CE device (e.g., CE device 36A of FIG. 2) receives a service provider identifier from a wireless device, the CE device may identify the associated attachment circuit to the mobile VPN for the service provider using mobile VPN table 300. The CE device then uses the attachment circuit to forward IP traffic to the mobile VPN for the wireless device. A CE device that includes mobile VPN table 300 may therefore provide connectivity to mobile VPNs for multiple different service providers and, by extension, support customers that attach using an alternate access network for which the CE device operates as a gateway or aggregator and that subscribe to any of the different service providers listed in mobile VPN table 300.

Various embodiments of the invention have been described. These and other embodiments are within the scope of the following claims.

What is claimed is:

1. A method comprising:
   allocating an Internet Protocol (IP) address to a wireless device with a home service provider network having a mobile virtual private network (VPN) that defines routes that are distinct and separate from a default routing space of the home service provider network, wherein the home service provider network is a Multiprotocol Label Switching (MPLS) network;
   dynamically extending the mobile VPN from the home service provider network to a visited service provider network when the wireless device attaches to an access network served by the visited service provider network to enable the wireless device to exchange network traffic with the visited service provider network using the IP address allocated by the home service provider network;
   receiving and installing, to a VPN routing and forwarding (VRF) instance associated with the mobile VPN within an autonomous system border router (ASBR) of the home service provider network, a route specifying a prefix for the IP address and an associated inter-autonomous system (inter-AS) MPLS label, wherein the ASBR receives the route from the visited service provider network;
   forwarding, with the ASBR, the route and a backbone MPLS label to a provider edge (PE) router of the home service provider network to dynamically extend the mobile VPN to the visited service provider network;
   associating the backbone MPLS label with the inter-AS MPLS label;
   receiving, with the ASBR, a packet destined for the IP address that is encapsulated with the backbone MPLS label from the PE router;
   mapping the backbone MPLS label to the inter-AS MPLS label;
   encapsulating the packet within the inter-AS MPLS label; and
   forwarding the encapsulated packet from the ASBR to a next hop specified by the route.

2. The method of claim 1, further comprising:
   receiving the packet destined for the IP address with the PE router of the home service provider network; and
   forwarding the packet from the PE router toward the wireless device using the mobile VPN.

3. The method of claim 2,
   wherein the route comprises a first route,
   wherein dynamically extending the mobile VPN to the visited service provider network comprises receiving and installing a second route specifying a prefix for the IP address to a VRF instance associated with the mobile VPN within the PE router of the home service provider network, wherein the second route specifies a next hop router to the visited service provider network, the method further comprising:
   forwarding, by the PE router, the packet based at least on the second route.

4. The method of claim 2, further comprising:
   tunneling the packet toward the ASBR of the home service provider network that is a next hop router to the visited service provider network.

5. The method of claim 4, further comprising:
   receiving, with the PE router of the home service provider network, a backbone MPLS label associated with the second route, wherein tunneling the packet toward the ASBR of the home service provider network comprises sending the packet encapsulated in the backbone MPLS label to the ASBR.

6. The method of claim 1, further comprising:
   receiving, with the ASBR, a route target associated with the VRF instance from the visited service provider network; and
   sending routes installed to the VRF instance to the visited service provider network.

7. The method of claim 1,
   wherein dynamically extending the mobile VPN comprises advertising a route from the PE router of the home service provider network to the visited service provider network, wherein the route specifies a prefix for a packet data network (PDN), reachable by the PE router of the home service provider network, that provides services to customers of the home service provider network.

8. A method comprising:
   attaching to a cellular wireless access network with a wireless device;
   receiving an IP address for the wireless device from the cellular wireless access network;
   while the wireless device is attached to the cellular wireless access network and not attached to a non-cellular wireless access network, establishing a higher-layer protocol session with the wireless device that operates over an IP layer;

subsequent to receiving the IP address from the cellular wireless access network, attaching to the non-cellular wireless access network with the wireless device; and subsequent to attaching to the non-cellular wireless access network with the wireless device, receiving, with the wireless device, packets for the higher-layer protocol session and destined for the IP address for the wireless device from the non-cellular wireless access network to continue the higher-layer protocol session.

9. The method of claim 8, wherein the non-cellular wireless access network is a wireless local area network (WLAN).

10. The method of claim 8, wherein the non-cellular wireless access network is a WiFi network.

11. The method of claim 8, further comprising:
sending an identifier for a service provider of the cellular wireless access network from the wireless device to the non-cellular wireless access network.

12. The method of claim 8, wherein attaching to the non-cellular wireless access network comprises authenticating the wireless device to a service provider of the cellular wireless access network.

13. A method comprising:
peering, with a peering exchange system, to a home service provider network;
peering, with the peering exchange system, to a visited service provider network; and
extending, with the peering exchange system, a mobile virtual private network (VPN) established by the home service provider network to a visited service provider network;
receiving, with the peering exchange system, a route associated with the mobile VPN from the visited service provider network, wherein the route specifies a prefix corresponding to an Internet Protocol (IP) address of a wireless device and wherein the route specifies a next hop router; and
advertising the route from the peering exchange system to the home service provider network.

14. The method of claim 13, further comprising:
advertising a route associated with the mobile VPN from the peering exchange system to the visited service provider network.

15. The method of claim 13, wherein the visited service provider network is a first visited service provider network, the method further comprising:
extending, with the peering exchange system, the mobile VPN to a second visited service provider network without receiving additional routes from the home service provider network; and
advertising the route associated with the mobile VPN from the peering exchange system to the second visited service provider network.

16. A method comprising:
establishing, with a network device, an access channel for a wireless device attached to a wireless access network;
associating, in context information of the network device, the access channel to an Internet Protocol (IP) address of the wireless device;
receiving, with the network device, a first packet addressed to the IP address of the wireless device;
based at least on the context information, forwarding the first packet to the wireless device using the access channel;
receiving, with the network device, a route associated with a mobile virtual private network (VPN), wherein the route specifies a prefix corresponding to the IP address of the wireless device and a next hop router;
receiving, with the network device, a second packet addressed to the IP address of the wireless device; and
based at least on the route, forwarding the second packet to the next hop router.

17. The method of claim 16, wherein the mobile virtual private network is associated with a VPN routing and forwarding (VRF) instance of the network device, the method further comprising:
installing the route to the VRF instance.

18. The method of claim 16, further comprising:
mapping the IP address to an outbound interface of the network device toward the next hop router; and
forwarding the second packet to the next hop router using the outbound interface.

19. The method of claim 16, wherein the network device is a provider edge router of a home service provider network and provides reachability to a packet data network (PDN) that provides services to customers of the home service provider network, the method further comprising:
receiving the first packet and the second packet from the PDN.

20. The method of claim 16,
wherein the network device is a provider edge router of a home service provider network, and
wherein the next hop router is an autonomous system border router of the home service provider network that received the route from a visited service provider network.

21. The method of claim 16,
wherein the wireless access network is selected from the group consisting of a Long Term Evolution (LTE), a Universal Mobile Telephony Service (UMTS), a General Packet Radio Service (GPRS), and a WiMAX mobile service provider network.

22. The method of claim 16, further comprising:
receiving a backbone MPLS label with the received route; and
encapsulating the second packet with the backbone MPLS label prior to forwarding the second packet to the next hop router.

23. A mobile gateway comprising:
a control unit comprising one or more processors;
a plurality of interface cards;
an enhanced Universal Mobile Telecommunications System (E-UTRAN) interface of the control unit that establishes a bearer over a wireless access network and associates, in context information, the bearer to an IP address,
wherein one of the plurality of interface cards receives a first packet addressed to the IP address of the wireless device;
a forwarding component that, based at least on the context information, forwards the first packet to the wireless device using the bearer; and
a routing protocol daemon of the control unit that executes a routing protocol to receive a route, wherein the route specifies a prefix corresponding to the IP address of the wireless device and a next hop router,
wherein one of the plurality of interface cards receives a second packet addressed to the IP address of the wireless device,
wherein the forwarding component, based at least on the route, forwards the second packet to the next hop router.

24. The mobile gateway of claim 23, further comprising:
a virtual private network (VPN) routing and forwarding instance of the control unit,
wherein the routing protocol daemon installs the route to the VRF.

25. The mobile gateway of claim 24, further comprising:
forwarding information of the control unit that maps IP addresses for network destinations to outbound interfaces,
wherein the forwarding component forwards the first packet and second packet based at least on the forwarding information,
wherein the E-UTRAN interface installs the context information to the forwarding information to map the IP address of the wireless device to an outbound interface for the bearer, and
wherein the VRF instance installs the route to the forwarding information to remap the IP address of the wireless device to an outbound interface for the route.

26. The mobile gateway of claim 23, wherein the mobile gateway is selected from the group consisting of a Gateway General Packet Radio Service (GPRS) Serving Node (GGSN), an Access Gateway (aGW), and a Packet Gateway (P-GW).

27. The mobile gateway of claim 23,
wherein the routing protocol daemon receives a backbone Multiprotocol Label Switching (MPLS) label with the received route, and
wherein the forwarding component encapsulates the second packet with the backbone MPLS label prior to forwarding the second packet to the next hop router.

28. A system comprising:
an autonomous system border router (ASBR) of a Multiprotocol Label Switching (MPLS) service provider network;
a provider edge (PE) router that offers, to wireless devices, connectivity to the service provider network,
wherein the PE router receives a user identifier and a mobile virtual private network (VPN) identifier from a wireless device, and
wherein the PE router receives a route target for the mobile VPN;
a VPN routing and forwarding (VRF) instance of the PE router that is associated with the route target,
wherein the PE router sends the route target to the ASBR to join the mobile VPN,
wherein the ASBR receives a route for the route target and associated with the identified VPN from an ASBR of a visited service provider network and forwards the route and a backbone MPLS label to the PE router, wherein the route specifies the ASBR as a next hop router,
wherein the PE router installs the route and backbone MPLS label to the VRF instance,
wherein the PE router receives, from the wireless device, a packet matching the route, encapsulates the packet within the backbone MPLS label, and forwards the labeled packet to the ASBR, and
wherein the ASBR identifies the visited service provider network using the backbone MPLS label and forwards the packet to the ASBR of the visited service provider network.

29. The system of claim 28, wherein the PE router receives an IP address for the wireless device and forwards the IP address to the wireless device.

30. The system of claim 28,
wherein the ASBR receive an inter-autonomous system (AS) MPLS label together with the route from the ASBR of the visited service provider network, and
wherein the ASBR maps the backbone MPLS label to the inter-AS MPLS label and identifies the visited service provider network using the mapping.

* * * * *